United States Patent [19]

Torrence

[11] Patent Number: 5,085,267

[45] Date of Patent: Feb. 4, 1992

[54] COMPENSATING FOR WATER PRESSURE VARIATIONS IN A TEMPERED AIR SYSTEM FOR VEHICLE PASSENGER COMPARTMENTS

[75] Inventor: Robert J. Torrence, Addison, Ill.

[73] Assignee: Eaton Corporation, Cleveland, Ohio

[21] Appl. No.: 539,400

[22] Filed: Jun. 18, 1990

[51] Int. Cl.$^5$ .............. F25B 29/00; B60H 1/02; G05D 23/00

[52] U.S. Cl. .............. 165/2; 165/39; 165/40; 165/42; 165/43; 237/2 A; 237/12.3 B; 236/91 F; 318/641; 165/31

[58] Field of Search ............ 237/2 A, 12.3 R, 12.3 A, 237/12.3 B, 12.3 C; 165/31, 2, 39, 40, 42, 43; 236/91 F; 318/641; 417/293, 294, 292

[56] References Cited

U.S. PATENT DOCUMENTS

| | | | |
|---|---|---|---|
| 2,277,598 | 3/1942 | McCollum | 237/2 A |
| 3,032,324 | 5/1962 | Fiala | 237/2 A |
| 3,122,199 | 2/1964 | Byloff | 165/40 |
| 3,183,962 | 5/1965 | Steinhagen et al. | 165/42 |
| 3,658,244 | 4/1972 | Caldwell | 237/2 A |
| 4,058,255 | 11/1977 | Linda et al. | 237/12.3 B |
| 4,189,093 | 2/1980 | Schnaibel et al. | 165/40 |
| 4,373,666 | 2/1983 | Williams | 237/12.3 B |
| 4,417,688 | 11/1983 | Schnaibel et al. | 237/2 A |
| 4,462,541 | 7/1984 | Hansen | 237/2 A |
| 4,974,664 | 12/1990 | Glennon et al. | 165/43 |

FOREIGN PATENT DOCUMENTS

| | | | |
|---|---|---|---|
| 0065802 | 5/1979 | Japan | 417/293 |
| 0197709 | 2/1977 | U.S.S.R. | 165/40 |

Primary Examiner—John Ford
Attorney, Agent, or Firm—R. A. Johnston

[57] ABSTRACT

An automatic control system for regulating the temperature of blower air discharged over a heater core to a vehicle passenger compartment. A thermistor is disposed to sense discharge air adjacent the heater core and provide a temperature signal. An electrical indication is provided of the condition of a servomotor driven valve controlling water flow to the heater core. An electrical reference signal is provided indicative of a user selected relative change of flow discharge air temperature. A signal is provided indicating inlet pressure to the valve controlling flow of liquid to the heater core. The signals are summed; and, the valve servo driven until the sum is zero modulating the valve to maintain the sum at zero for regulating blower air discharge temperature at a constant level.

7 Claims, 2 Drawing Sheets

COMPENSATING FOR WATER PRESSURE VARIATIONS IN A TEMPERED AIR SYSTEM FOR VEHICLE PASSENGER COMPARTMENTS

BACKGROUND OF THE INVENTION

The present invention relates to comfort or climate control systems employed in the passenger compartment of automotive vehicles. Heretofore, where it has been desired to provide a way or means of controlling the discharge air temperature of an automotive heating and air conditioning system, temperature control has been accomplished by varying the opening of the water valve and controlling flow through the heater core or cabin heat exchanger to provide the desired temperature. It has been proposed in co-pending application Ser. No. 473,141 filed Feb. 1, 1990 now U.S. Pat No. 4,949,779 issued Aug. 21, 1990, entitled "Regulating Heater Discharge Air Temperature for Front and Rear Passengers in a Vehicle", Kenny et al and commonly owned with the present application, to provide automatic control of the heater core water valve by sensing the temperature of the discharge air over the cabin heat exchanger and the position of the valve and comparing with respect to a reference temperature level for generating a control signal to modulate the water valve. This latter type of system functions to regulate the heat exchanger discharge air temperature about a relatively selected level.

However, problems have been experienced in employing the aforesaid automatic discharge air temperature regulation system when the water pump is driven at engine idle speed, because at idle speed there is insufficient flow of heated liquid through the heat exchanger to enable the heat exchanger to provide adequate heat to the discharge air stream as may be needed for the desired regulation. Furthermore, if adequate flow of a liquid is provided at engine idle speed, then at higher engine RPM's encountered at road speeds, the water valve is operated in the nearly closed position by the system in order to maintain proper regulation. Consequently, it has been necessary for the sensitivity of the system, or resolution of the movement of the water valve to be prohibitively high in order to prevent over controlling or "hunting".

In the copending and commonly owned application Ser. No. 479,873 filed Feb. 14, 1990 now U.S. Pat. No. 4,974,664 issued Dec. 4, 1990, of Glennon et al entitled "Compensating For Water Pump Speed Variations In A Tempered Air System For Vehicle Passenger Compartments" it is described to sum signals representative of water valve position, water pump speed, relative selected temperature and Plenum air discharge temperature and generating a control signal to effect movement of the servo-actuator driven water valve until the sum is zeroed.

However, the aforesaid technique of Glennon et al has the disadvantage of requiring a water pump speed sensor located in the engine compartment and associated wiring to connect the electronic circuitry performing the electrical summing. Such an arrangement often requires additional wiring through the engine compartment bulkhead and is thus difficult to install and therefore costly in mass production.

Accordingly, it has been desired to provide a low cost and compact way or means of compensating for variations in water supply pressure for controlling liquid flow to a heat exchanger employed in a vehicle passenger compartment.

SUMMARY OF THE INVENTION

The present invention provides a control system for regulating the temperature of forced air discharged from a heat exchanger employed in a vehicle passenger compartment. A servomotor operated water valve is provided at the inlet of the exothermic heat exchanger or heater core; and, the position of the valve is modulated in response to a control signal for controlling flow of the engine coolant or heating fluid to the exothermic heat exchanger. A transducer is located near the valve inlet and provides a signal indicative of the water or engine coolant pressure at the valve inlet.

A thermistor is disposed adjacent the heat exchanger to sense the temperature of the forced air discharged thereover and into the passenger compartment. A temperature selection control is provided for selection of the relative temperature level desired by the passengers. An electric controller employing a microprocessor receives an electric reference signal representing the relative temperature selected, an electrical signal indicative of the temperature sensed by the thermistor, an electrical indication of the valve position and the electrical signal indicative of water pressure. The controller generates a control signal proportional to the sum of these signals; and, a motorized valve servo actuator is responsive to the control signal to move the valve until the sum is zeroed. The resultant control of the flow of coolant to the heat exchanger provides regulation of the discharge air temperature to the passenger compartment about the selected relative level despite swings in inlet water pressure.

In the simplest form of the invention, only a heating mode or exothermic heat exchanger is employed. In the preferred practice of the invention however, a refrigerant evaporator or endothermic heat exchanger is disposed in the forced air stream up stream of the heater core or exothermic heat exchanger, or between the heater core and the blower.

In this preferred arrangement, a module is provided with the evaporator and heater core in tandem in the forced air stream in the plenum housing; and, the sensed temperature is the result of the combined effects of cooling and heating of the forced air. The present invention thus provides an automatic control system for regulating the blower air discharge temperature about relatively desired temperature level for maintaining passenger comfort.

The control system of the present invention provides a novel technique for passenger compartment blower air temperature regulation and functions to automatically modulate the position of a valve controlling flow of heated engine coolant to a heater core disposed in the passenger compartment for regulating discharge air temperature about a user selected relative level. The automatic regulation accommodates changes in water inlet pressure to the heater core water valve or changes in the passenger selected blower speed.

DETAILED DESCRIPTION

Figure 1:
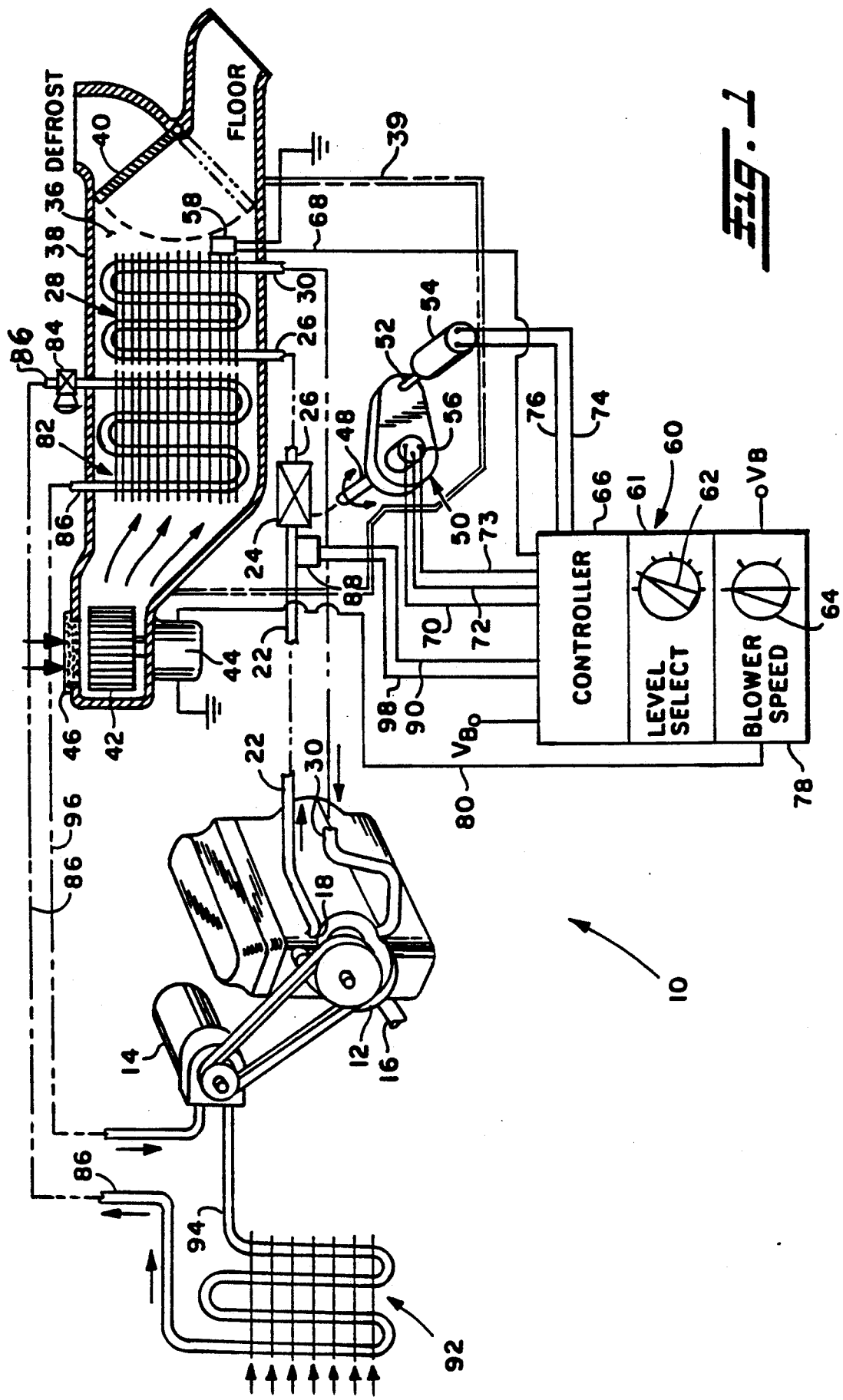
FIG. 1 is a pictorial, somewhat schematic representation of the control system showing the arrangement of the heat exchangers, controllers, sensors and valve actuators; and, FIG. 2 is an electrical schematic of the circuitry employed in the system of FIG. 1.

Referring to FIG. 1, the control system of the present invention is indicated generally by the reference numeral 10 and is shown as installed in a typical automotive passenger vehicle having an engine driven water pump 12 for circulating engine coolant and also an engine driven refrigerant compressor 14 for circulating refrigerant. The water pump 12 has a primary inlet 16 for receiving therein coolant from the engine cooling radiator (not shown); and, the pump has its primary outlet communicating with the internal passages for circulation of coolant through the engine and which passages are not shown in FIG. 1 for the sake of brevity. Water pump 12 has an auxiliary outlet 18 which is connected for providing a source of engine coolant through conduit 22 to the inlet of a control valve 24, preferably of the butterfly type. Valve 24 has its outlet connected through conduit 26 to the inlet of a heater core or heat exchanger indicated generally at 28. The heater core 28 circulates coolant through conduit 30 which is connected to an auxiliary return of the water Pump 12. In the presently preferred practice, valve 24 is a by-pass type butterfly valve giving substantially full flow with 30° rotation of the butterfly from the closed position.

Heater core 28 is disposed in a plenum chamber 36 formed within a housing or duct 38 disposed preferably in the vehicle passenger compartment. The housing 38 has an upper or "DEFROST" outlet and a lower or "FLOOR" outlet with a pivotally disposed vane or mode select door 40 which provides for selection of the outlet to be supplied. Vane 40 may be moved by an suitable type of actuator (not shown) either manually or automatically.

Housing 38 also has disposed therein a suitable blower 42 driven by motor 44 typically mounted externally to the housing with the shaft thereof extending through the housing wall. Blower 42 is supplied with, as indicated by arrows in FIG. 1, air through a suitable filtered inlet 46 which may be selectably connected (by means not shown) for either recirculation of passenger compartment air or for intake of ambient air from the vehicle exterior as is well known in the art. Upon energization of motor 44, blower 42 provides a flow of air over the heat exchanger 28 for discharge through either the FLOOR or DEFROST outlets as desired.

The butterfly control valve 24 is connected via shaft 48 to a rotary servo-actuator, indicated generally by numeral 50, which has shaft 48 as its output, and an input shaft 52 thereof connected to a suitable reversible 12 volt DC motor 54. Actuator 50 has provided thereon a position sensor 56 for output shaft 48 in the form of potentiometer which is operative as will be hereinafter described, to provide an electrical signal indicative of the rotary position of shaft 48. Actuator 50 is operative upon the energization of motor 54 to rotate output shaft 48 in either a clockwise or counter clockwise sense for moving a butterfly vane member (not shown) within valve 24 for modulating coolant flow to the heat exchanger 28. In the presently preferred practice, servo-actuator 50 includes a speed reducer providing a reduced rate of rotation at output shaft 48. A ratio of 30:1 has been found satisfactory from input to output of the servo-actuator 50, but other ratios may be employed as desired to provide differing rates of response.

Although a D.C. motorized servo-actuator with a feedback potentiometer is disclosed, it will be understood that the potentiometer can be eliminated if desired and other feedback techniques employed. Also, a stepper motor may be employed, in which case the speed reducer will not require the high ratio of input to output; and, if stepper motor torque is sufficient, speed reduction may not be required.

A discharge air temperature sensor in the form of thermistor 58 is disposed within the plenum 36 closely adjacent the downstream or discharge edge of the heater core 28 for sensing the temperature of the air in the plenum chamber.

A control module, indicated generally by reference numeral 60, is disposed in the vehicle passenger compartment in a suitable manner as to be readily accessible to the occupants, preferably the driver. The module 60 includes a temperature LEVEL SELECT control 61 having a rotatable knob 62, an electronic controller 66; and module 60 may include a BLOWER SPEED control 78 having a selector knob 64.

The controller 66 receives power from the vehicle power supply $V_B$ and is connected to receive an input from thermistor 58 along lead 68 and is also connected to the receive an input from the feedback potentiometer 56 along leads 70, 72, 73 with lead 73 being the neutral or ground lead. The servo-actuator drive motor 54 is connected to controller 66 via leads 74, 76.

The blower motor 44 is connected on one side to blower speed control 78 by lead 80 with the opposite lead of the motor grounded to the common ground for the supply $V_B$ which in a typical automotive negative ground system is the vehicle body metal.

If the vehicle is equipped with passenger compartment air conditioning, a second endothermic heat exchanger comprising a refrigerant evaporator, indicated generally by numeral 82, is disposed in the housing 38 upstream of the heater core 28 or between the heater core 28 and the blower 42. Evaporator 82 is supplied refrigerant through a thermal expansion valve 84 which has its inlet connected via conduit 86 to the outlet of refrigerant liquefication heat exchanger, or condenser, indicated generally by numeral 92. Condenser 92 is supplied via conduit 94 which is connected to the high pressure discharge outlet port of compressor 14.

In the system illustrated in FIG. 1, the flow of refrigerant to the evaporator 82 is controlled by the thermal expansion valve 84 in a manner well known in the art to maintain optimum vaporization of the liquid coolant such that a slight amount of super heat is provided at the outlet of the evaporator and such that no liquid is returned through conduit 96 to the low pressure suction port of compressor 14. With the evaporator 82 in place in the blower stream ahead of the heater core 28, the thermistor 58 is operative to sense the combined cooling and heating effects of the two heat exchangers.

The temperature of the forced air flow in plenum chamber 36 is controlled in this arrangement by modulating the position of water valve 24 and controlling the flow of coolant through the evaporator 28. Thus, it will be seen that the simplest form of the system, which employs only heater core 28, retains the ability to control and regulate the plenum discharge temperature upon the addition of air conditioning evaporator 82 into the system. Thus, the control system may be employed either with our without air conditioning in the vehicle.

A pressure sensor 88 preferably a transducer is provided in the conduit at the inlet of the water valve 24 and provides an electrical pressure signal output along leads 90, 98 to the controller 66. The pressure signal provides an electrical indication of changes in water inlet pressure to the valve.

Figure 2:
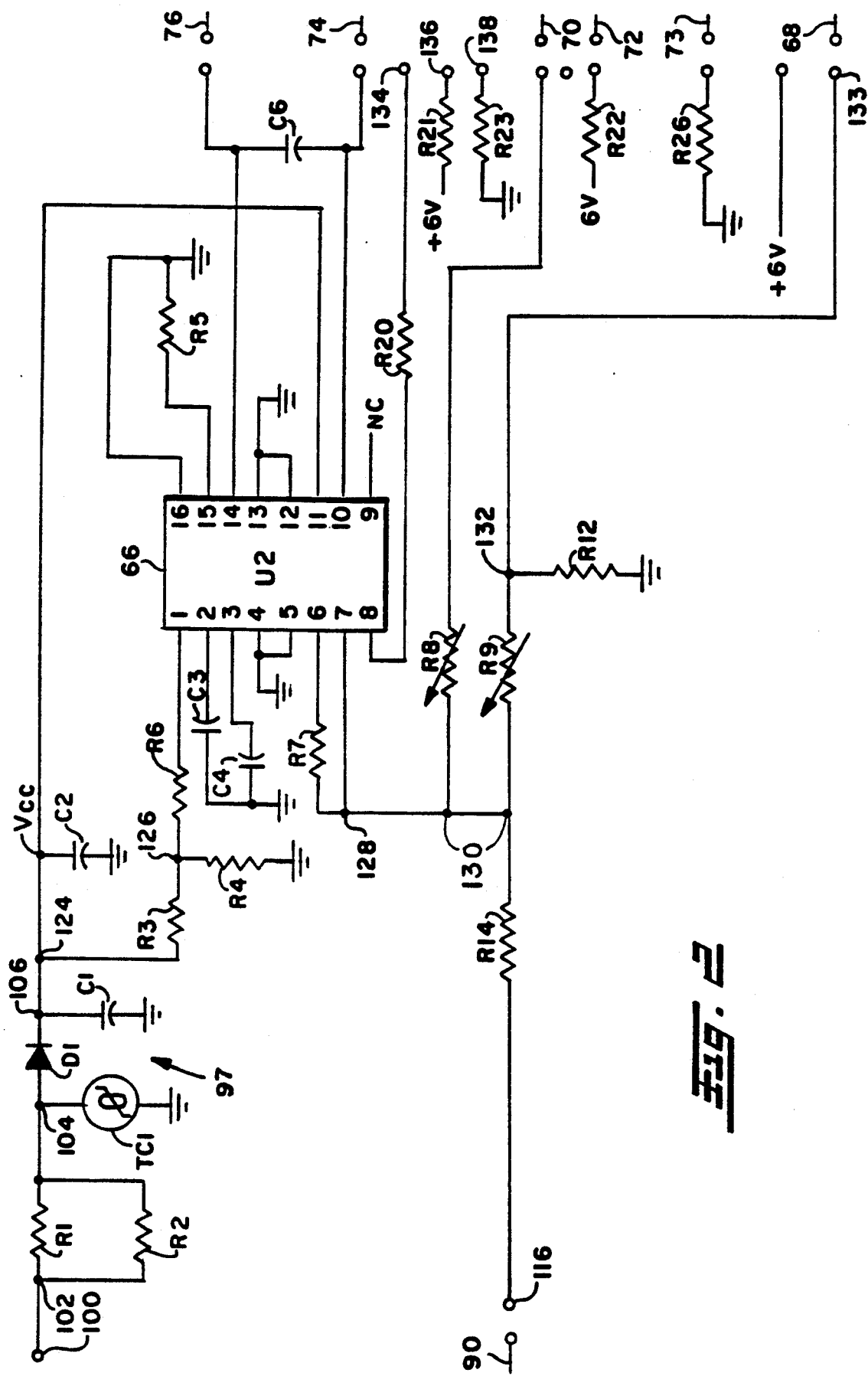

Referring to FIG. 2, the electrical circuitry for the invention is illustrated and includes a power supply indicated generally at 97 for the control module 60, wherein the onboard vehicle power supply V is connected through terminal 100 and through to junction 102. A pair of resistors R1 and R2 are connected in parallel to junction 102 and junction 104 which is grounded through Zener device TC1 which is a 22 volt metal oxide varistor functioning as a transient suppressor. Junction 104 is connected through a forward poled diode D1 to junction 106 which is grounded through capacitor C1 and which provides the power supply voltage Vcc.

The controller 66 comprises a microprocessor designated U2 in FIG. 2, and which, in the presently preferred practice of the invention, bears manufacturer's designation MC33030 and is available from Motorola Semiconductor Div. Schaumberg, Ill.

The signal from the pressure transducer 88 is received along lead 90 through connector terminal 116. Junction 124 is connected to junction 106 and 13 also connected through resistor R3 to junction 126 which is grounded through R4 and also connected through R6 to pin 1 of a microprocessor U2. Junction 124 is also grounded through transient suppression capacitor C2.

Pin 2 of U2 is grounded through C3; and, pin 3 is grounded through C4. Pins 4 and 5 are grounded directly; and, pin 6 receives an input through R7 from junction 128 which is also connected to pin 7. Junction 128 is also connected to junction 130 which receives a signal through R14 from connector terminal 116 which receives the signal from the pressure transducer 88 via lead 90. Junction 130 is connected through R9 through junction 132 which is grounded through R12 and also connected through connector terminal 133 t signal line 68 of the thermistor 58.

Junction 130 is also connected through R8 to lead 70 of the feedback potentiometer 50 with lead 73 grounded and lead 72 receiving a low bias voltage through R26.

Pins 14 and 10 of U2 are connected respectively to motor output leads 76, 74 for the servomotor 54; and, capacitor C6 is connected therebetween. Pin 8 is connected through R20 to the LEVEL SELECT control 61 which comprises a potentiometer receiving power through R21 and connector 136, with the center tap thereof grounded through connector 138 and R23.

Pin 9 of U2 is unused.

In operation, the microprocessor U2 performs the summation according to the expression:

$$K_1 V_{ch} - K_2 V_{fb} - K_3 V_{ts} - K_4 V_p = 0,$$

where $A_1=1$, $K_2=R7/R8$, $K_3=R7/R9$, and $K_4=R7/R14$.

$V_{ch}$ is the voltage from the level selector 62, $V_{fb}$ is the voltage from the feedback potentiometer 65, $V_{ts}$ is the voltage from the thermistor 58 and $V_p$ is the voltage received from junction 116 from pressure transducer 88.

Microprocessor U2 is operative to provide forward and reverse motor control signals along lines 74, 76 to modulate the position of the valve 24 to continuously satisfy the summation, thereby maintaining the discharge temperature of the air in duct 36 at a constant temperature.

Values of the resistances, capacitances and designations of the solid state components are given in table I.

| R Destination | Ohms | C | Microfarads | Device | |
|---|---|---|---|---|---|
| 1,2 | 43,1/2W | 1 | 10 | D1 | 1N4002 |
| 3,4,6 | 10K | 2 | 400 | | |
| 5 | 68K | | | | |
| 7 | 110K | 3,4,6 | 0.1 | | |
| 8 | 50K | 5 | 1 | U2 | MC33030 |
| 9 | 6.2K | | | U3 | LM2907 |
| 12,16 | 10K | | | | |
| 14 | 130K | | | | |
| 20,21 | 20K | | | | |
| 22,23 | 20K | | | | |
| 26 | 20K | | | | |

The present invention thus provides an automatic system for regulating the temperature of tempered air discharging from the vehicle heating and airconditioning system at a constant level by modulating the position of the water valve supplying heated engine coolant to the heater core. The system of the present invention Provides a water inlet pressure signal to the controller which sums the pressure signal, an electrical indication of a water valve position, a desired reference level signal and a temperature signal from a thermistor located in the plenum at the temperature discharge side of the heater core.

The system operates to maintain the summation at zero by modulating the position of the water valve.

Although the invention has herein above described with respect to illustrated embodiment, it will be understood that the modifications and variations of the invention may be made by those of ordinary skill in the art; and, the invention is therefore limited only by the scope of the following claims

I claim:

1. A system for controlling heating of an occupied compartment:
   (a) pump means operative to provide a source of heated liquid;
   (b) heat exchanger means operatively connected for flow therethrough of said heated liquid;
   (c) valve means operative upon movement between a closed and a plurality of open positions to control the flow of said liquid to said heat exchanger means;
   (d) servo-actuator means operative, upon receipt of an electrical control signal, to move said valve between said closed and open positions;
   (e) means operative to sense the position of said valve means and provide an electrical feedback signal indicative thereof;
   (f) pressure transducer means disposed to sense the pressure of said liquid flow into said valve means and operative to provide and electrical pressure signal indicative thereof;
   (g) relative temperature selector means operative upon an input by the compartment occupant to provide an electrical input signal indicative of an occupant desired relative temperature level;
   (h) blower means directing a flow of air over said heat exchanger means;
   (i) plenum means operative to direct said flow of air to said occupied compartment;
   (j) temperature sensing means sensing the thermal effect of said air flow over said heat exchanger means and operative to provide and electrical temperature signal indicative thereof;

(k) circuit means operative to sum said feedback signal, said temperature signal, said pressure signal, and said input signal and provide an electrical indication of said summation;

(l) signal generating means connected to said circuit means and operative in response to said summation to generate a control signal for operating said servo-actuator means to move said valve means until said sum is zero.

2. The system defined in claim 1, wherein said valve means, said servo-actuator means and said pressure transducer means are mounted on a common housing.

3. The system defined in claim 1, wherein said valve means, said servo-actuator means, said heat exchanger means and said pressure transducer means are formed as an integral sub-assembly.

4. The system defined in claim 1, wherein said temperature sensing means is disposed to sense the temperature of air in said plenum means.

5. The system defined in claim 1, wherein said circuit means is operable in response to a user input from said relative temperature selector means to change the said directed air temperature reference level.

6. A method of regulating the temperature of blower discharge air in a vehicle passenger compartment heating system;

(a) providing an exothermic heat exchanger and flowing heated liquid therethrough from an engine driven pump;

(b) forcing a flow of air over the heat exchanger and directing the flow into the vehicle passenger compartment;

(c) providing a motor driven valve for controlling liquid flow from the pump to the heat exchanger and providing an electrical indication of the condition of said valve;

(d) sensing the temperature of the air flow over said heat exchanger and providing an electrical temperature signal;

(e) sensing the pressure of said liquid from said pump and generating an electrical signal indicative of the pressure;

(f) generating an electrical reference signal indicative of a user selected relative temperature signal;

(g) summing said indication of valve condition, said temperature signal, said pressure signal and said reference signal;

(h) driving said valve motor until said sum is zero and modulating said valve condition for maintaining said sum at zero.

7. The method in claim 3 further comprising the steps of:

(a) disposing a refrigerant evaporator in said forced air flow upstream of said heat exchanger, and, (b) flowing refrigerant through said evaporator.

* * * * *

UNITED STATES PATENT AND TRADEMARK OFFICE
CERTIFICATE OF CORRECTION

PATENT NO. : 5,085,267

DATED : February 4, 1992

INVENTOR(S) : Robert J. Torrence

It is certified that error appears in the above-identified patent and that said Letters Patent is hereby corrected as shown below:

Column 6, Line 57: and operative to provide an[d] electrical pressure

Signed and Sealed this

Thirteenth Day of July, 1993

Attest:

MICHAEL K. KIRK

Attesting Officer

Acting Commissioner of Patents and Trademarks